Oct. 4, 1932.  M. G. HILPERT  1,880,201
TURNTABLE CENTER
Filed May 29, 1930  7 Sheets-Sheet 1

INVENTOR
*Meier Geo. Hilpert,*
BY
ATTORNEY

Oct. 4, 1932.  M. G. HILPERT  1,880,201

TURNTABLE CENTER

Filed May 29, 1930  7 Sheets-Sheet 3

WITNESSES:—
Chas. L. Griesbauer
Carroll Bailey

INVENTOR
Meier Geo. Hilpert,
BY
O. P. Wochaupter
ATTORNEY

Fig. 10.

Oct. 4, 1932.  M. G. HILPERT  1,880,201
TURNTABLE CENTER
Filed May 29, 1930  7 Sheets-Sheet 5

Fig. 11.

INVENTOR
*Meier Geo. Hilpert,*
BY
*O. P. Wolhaupter*
ATTORNEY

Patented Oct. 4, 1932

1,880,201

UNITED STATES PATENT OFFICE

MEIER GEORGE HILPERT, OF BETHLEHEM, PENNSYLVANIA

TURNTABLE CENTER

Application filed May 29, 1930. Serial No. 457,314.

This invention relates to turntables, used for turning locomotives and other railway vehicles end for end, and has particular reference to an improved center mounting for turntables of the so-called three point supported type. Heretofore, modern turntable center mountings usually have been composed of expensive steel castings. These castings, as detailed, require difficult reentrant machining, with the consequent result that many castings are spoiled during machining and must be rejected. Moreover, said castings are of materially higher cost than rolled slabs or are not readily susceptible to treatment to effect hardening of the surfaces thereof which are subjected to wear.

Accordingly, one of the objects of the present invention is to provide a turntable center mounting which enables the use of relatively inexpensive rolled slabs or forgings, which eliminates the necessity of reentrant machining, and which allows of readily hardening such surfaces as are subjected to wear.

The maintenance cost of a turntable is mainly the cost of lubrication and examination, and in this connection another object of the present invention is to provide a turntable center mounting which is capable of expeditious assembly, and quick and easy disassembly for inspection or other purposes, and which allows of readily varying the lubricant according to the conditions of use of a particular turntable.

Another object of the present invention is to provide a turntable center mounting of minimum height, so that same is subjected to minimum upsetting tendency by the horizontal forces developed when a locomotive or other vehicle is braked or stopped after having been moved upon the turntable. Also, in this connection, it is an object of the present invention to provide a construction by means of which the horizontal forces are transferred from the table substantially direct to the base of the center mounting, thus to relieve the weight supporting wear elements of harmful lateral, dislodging forces and to enable said elements to better support their vertical loads and to be more readily lubricated.

Another object of the present invention is to provide a turntable center mounting which is particularly adapted to have the power cables led therethrough, whereby said cables may be housed and protected and disposed substantially out of sight, and whereby the installation and maintenance of the brush structure for completing electrical circuits from the cables to the driving motor or motors of the turntable may be considerably simplified.

Another object of the invention is to provide a turntable structure which, in general, is of relatively simple construction, of relatively low production cost, and which is strong, durable and thoroughly reliable and efficient in use.

With the foregoing and various other objects in view, the invention consists in the novel features of construction, combination and arrangement of parts as will be hereinafter more fully described, illustrated in the accompanying drawings and defined in the appended claims.

In the drawings, wherein like characters of reference denote corresponding parts in related views:—

Figure 1ª is a diagrammatic transverse section through the turntable shown in Fig. 1.

Figure 2ª is a diagrammatic transverse section through the turntable shown in Fig. 2.

Figure 3ª is a sectional plan view of the cross girder construction shown in Fig. 3.

Figure 4ª is a sectional plan view of the cross girder construction shown in Fig. 4.

Figure 1:
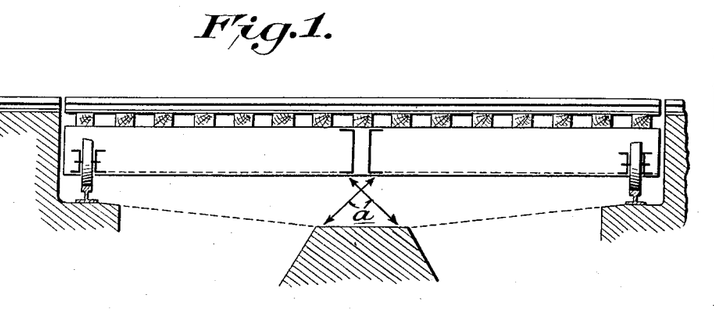
Figure 1 is a diagrammatic longitudinal sectional view through a turntable of the so-called continuous girder type, with which the present center mounting is adapted for use.
Figure 1A:
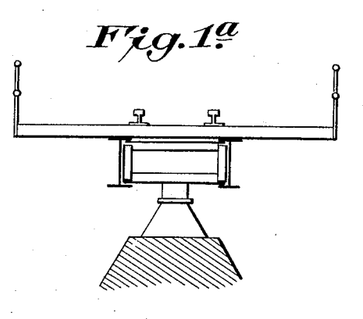
Figure 2:
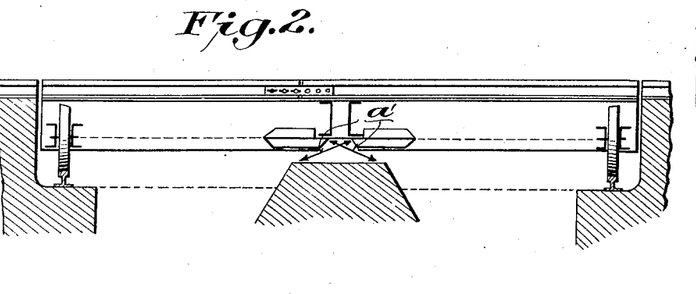
Figure 2 is a diagrammatic longitudinal sectional view through a turntable of the so-called articulated table type, with which the present center mounting also is adapted for use.
Figure 2A:
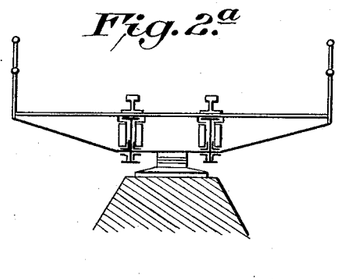

As a general rule, modern turntables are either of the continuous girder type illustrated in Figs. 1 and 1ª or of the articulated girder type illustrated in Figs. 2 and 2ª, the former deriving its name from the fact that the girders thereof are continuous from end to end of the turntable, and the latter deriving its name from the fact that the girders are parted at the center of the turntable and flexibly connected together. Each type has its advantages and both types usually are of a so-called three point supported design. That is to say, the table proper of each type usually is supported intermediately on a center mounting and at each of its ends on a circular track, whereby the table is adapted for rotation.

Heretofore, it has been the usual practice to jack-up the table to afford access to the center mounting for inspection, lubrication, repair or other purposes, and as is apparent from a consideration of Fig. 1 of the drawings, this means that in order to secure a given elevation of the center portion of a turntable of the continuous girder type, the entire table structure must be lifted the same amount at each end as at its center, or else, if one end is not lifted at all, the other end must be lifted twice the height of the center portion. On the other hand, due to the flexible connection between the girders of a turntable of the articulated girder type, obviously it is possible to elevate the center of the table without lifting either end thereof.

The present center mounting is adapted for use with a turntable of either of the two usual types mentioned and when used with either type is designed, according to one embodiment thereof, to eliminate the necessity for elevation of the table to afford access to the mounting.

In Fig. 1 the arrows $a$ indicate the general direction of the forces transmitted through a high center mounting when a locomotive or other vehicle is braked or stopped on the turntable, while in Fig. 2 the arrows $a'$ indicate the general direction of the forces transmitted through a low center mounting under the same conditions. Obviously, with a low center mounting the forces are more nearly horizontal than with a high center mounting, and the upsetting tendency of the mounting is proportionately reduced. Therefore, a prime consideration in the designing of the present center mounting has been to provide a center mounting of the least practicable height.

Referring now particularly to the detail views of the present center mounting, it will be observed that same consists of a base A, a top or cap B, a wear disk C interposed between said base and said cap, and a thrust ring D surrounding the cap and the upper portion of the base and enclosing the wear disk.

The base A is inclusive of a cylindrical top portion 10 and a relatively wide bottom portion 11 adapted to rest upon and to be bolted or otherwise secured rigidly to the masonry at the bottom of the turntable pit. If desired, said portions may be formed as a one-piece casting or forging. Preferably, however, the cylindrical portion 10, which is subjected to wear upon its top and outer faces, is formed from hard or tool steel separately from the portion 11 and the latter is formed from soft or structural steel, the portion 11 being formed in its upper face with a recess to receive the bottom of the portion 10 for example, and the two portions being permanently and rigidly united in any suitable manner as, for example, by welding them together as indicated at 12.

From the cylindrical portion 10 at a suitable point below the top thereof, the upper face of the bottom portion 11 preferably is sloped downwardly and outwardly to a trough 13 which is provided by an annular upstanding rib 14 formed on the portion 11, this trough being designed for the collection of any lubricant which may escape from the mounting. From the trough 13 the lubricant is adapted to flow through an opening 15 in the base into a suitable collection receptacle 16 from which it may be drained to again be used for lubricating the center mounting or for other purposes.

Figures 5, 6, 7, 8, 9:
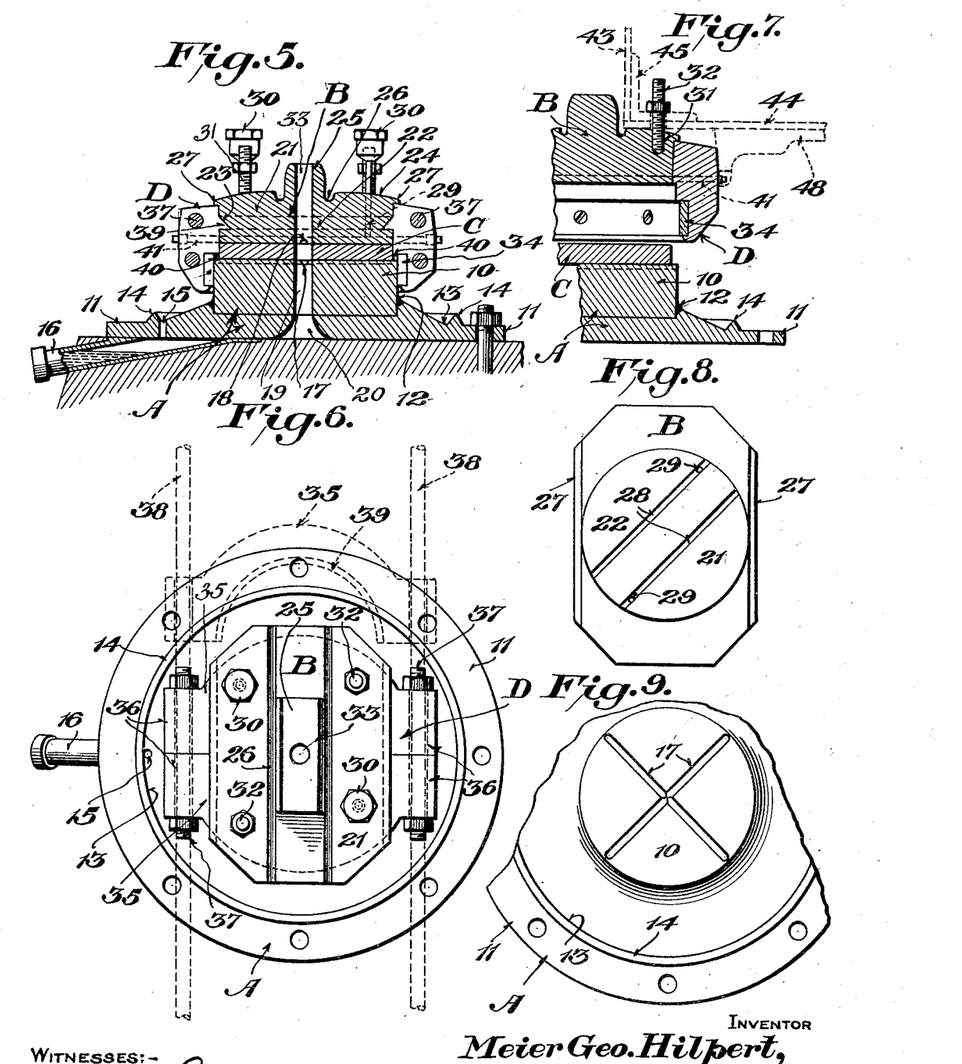
Figure 5 is a vertical section through one embodiment of the present center mounting.
Figure 6 is a top plan view of the center mounting structure shown in Fig. 5.
Figure 7 is a fragmentary vertical section through a slightly alternative embodiment of the present center mounting.
Figure 8 is a bottom plan view of the top member of the present center mounting.
Figure 9 is a fragmentary top plan view of the base element of the present center mounting.

In the top surface of the cylindrical base portion 10, which surface preferably is flat as shown, are formed lubricant distributing grooves 17 which may be crossed as shown in Fig. 9 or arranged in other suitable manner, while through the centers of the portions 10 and 11, alined openings 19 and 20, respectively, may be formed to enable current conducting cables to be led upward through the base.

The top or cap B is inclusive of a body portion 21 having a cylindrical portion 22 depending therefrom, said cylindrical portion 22 preferably being of slightly smaller diameter than the base cylindrical portion 10 and having formed therearound an annular channel 23. This channel is adapted to receive an internal rib on the thrust ring D whereby the latter is adapted to be supported by said cap B in operative relation to the base cylindrical portion 10, and to enable ready assembling of the thrust ring with the cap and at the same time to afford an efficient support for the thrust ring, said channel preferably is of substantially V-shaped cross section with the lower face thereof disposed horizontally.

The turntable is adapted to be supported at its center upon the upper face of the cap B, and in order to direct downwardly directed vertical loads towards the center of the present mounting, and to enable the girders or spans of the turntable to properly deflect under load, the said upper face of the cap B preferably is convexly curved as indicated at 24.

Preferably, the body portion of the cap B is of rectangular or substantially rectangular shape to afford at the top thereof a wide bearing area for the transverse girders of the spans of the turntable, and in order to facilitate proper positioning of the spans upon said surface, and to take the lateral forces imposed on the cap by said spans, said cap is provided with a central upstanding lug or boss 25 to be hereinafter again referred to.

The boss 25 is elongated in a direction transversely of the turntable and preferably is reduced slightly in width towards its top to facilitate entrance thereof into an opening formed in the turntable structure to receive same. At each side of said boss a drain groove 26 is formed in the top of the cap B and leads to the edges of said cap to conduct any rain water or the like which may reach the top of the cap away from the operating parts of the center mounting. Also, in this connection, it will be observed that the cap B is provided with a marginal outwardly directed flange 27 to overlie the inner edge portion of the thrust ring D and prevent any water flowing downwardly between the contacting surfaces of said ring and the cylindrical portion 22 of the cap.

Suitable lubricant distributing grooves 28 preferably are formed in the bottom flat face of the cylindrical portion 22 of the cap, and ducts 29 preferably are formed vertically through the cap for communication at their lower ends with said grooves, whereby lubricant is adapted to be supplied to the latter, said ducts being adapted to have oil cups 30 or pipes leading from a suitable source of lubricant supply connected therewith.

Also formed in the cap B is a plurality of openings 31 for the reception of studs or bolts 32 which may be employed to fasten the cross beams of the turntable to the cap whereby the latter may, if desired, be lifted with the turntable.

The cap B may be formed from structural steel and the wear surfaces thereof may be hardened, or it may be formed from hard or tool steel, and, of course an opening 33 may be formed centrally therethrough for alinement with the central passage in the base A to permit the power cables to be extended above the mounting.

The disk C may be formed from bronze or other metal suitable for operation against the steel parts A and B and may be of any suitable or desired thickness. In diameter it preferably corresponds to the diameter of the cylindrical portion 22 of the cap B, and it may have smooth top and bottom surfaces, or either or both of said surfaces may be provided with lubricant distributing grooves. Preferably, the corners thereof are rounded to facilitate assembly, and a central hole is formed therethrough to accommodate the cables heretofore mentioned.

The thrust ring D surrounds the cylindrical portion 22 of the cap B and depends from said cap so as to embrace the base cylindrical portion 10, whereby lateral forces imposed on the cap are transmitted substantially direct to the base and whereby the disk C is relieved of such forces. In instances where the turntable structure is capable of being elevated, the ring D may be formed in one piece as shown in Fig. 7 of the drawings, in which event any suitable means may be employed in lieu of a rib on the ring for engagement with a channel in the cylindrical portion 22 of the cap to maintain the cap and ring in assembly. In instances, however, where the turntable structure is not capable of being readily elevated, the ring D preferably is formed in two half sections as best shown in Fig. 6, whereby the sections may be moved laterally to and from an operative position embracing the cylindrical portions of the cap and the base. In either instance the ring D may be formed of steel and a wear ring or band 34 of bronze or the like may be mounted within the depending portion thereof for contact with the outer face of the base cylindrical portion 10.

In Fig. 6 the two half sections of the divided ring D are designated 35, 35 and, as will be observed, said sections are counterparts of one another, the wear ring or band 34 likewise being divided and a half section thereof being carried by each thrust ring section 35. Apertured lugs 36 are formed on the respective thrust ring sections for registration with one another when the two sections are moved together, and bolts 37 are adapted to be passed through said lugs to secure the sections in assembly with one another and in embracing relation to the cylindrical portions 10 and 22 of the base and the cap, respectively. Preferably, two vertically spaced bolts are employed in connection with each related pair of lugs so that one bolt of each pair may be removed to permit a pipe or rod substituted therefor while the other bolt maintains the sections in assembly. Thus, by then removing the other bolt, the sections obviously will be supported by the pipe or rod for outward sliding movement and subsequent inward sliding movement therealong. In Fig. 6 the pipes or rods which may be employed for temporarily supporting and guiding the thrust ring sections are indicated by dotted lines and designated as 38.

Each section 35 of the thrust ring has formed thereon and projecting from its inner face a rib 39 to fit into the channel 23 of the cap B, said ribs being of the same cross section as said channel. Thus, when the thrust ring sections are clamped by the bolts 37 in embracing relation to the cylindrical portion 22 of the cap, the thrust ring is held against downward movement relative to the cap by reason of the interfitting engagement between said ribs and said channel. Moreover, by reason of the diameter of the portion 22 and of the disk C being less than the diameter of the cylindrical portion 10 of the base, an annular space 40 is provided between the wear ring or band 34 and the periphery of the disk C into which lubricant may collect whereby the contacting or wear surfaces of the base, the disk and the wear ring are assured of complete lubrication.

An opening or openings 41 is or are formed through one or both of the thrust ring sections 35 for the introduction of lubricant into the mounting and to enable cleaning of the oil distributing grooves 28. If it is not practicable to employ a heavy lubricant, these openings may be plugged and only the ducts 29 may be utilized for the introduction of a light lubricant. However, either the ducts 29 or the openings 41 may be utilized for the introduction of either light or heavy lubricant. In either event, the lubricant introduced into the mounting obviously will reach all of the wear surfaces and any lubricant which may escape or be forced from the mounting between the ring or band D and the base cylindrical portion 10, will be either collected in the trough 13 or will flow from said trough into the receptacle 16 to be readily recovered.

Figure 3:
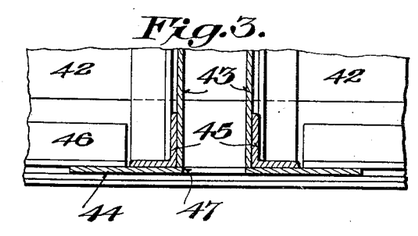
Figure 3 is a detail sectional view showing an embodiment of the present cross girder construction for incorporation in a turntable of the continuous girder type to accommodate the present center mounting.
Figure 3A:
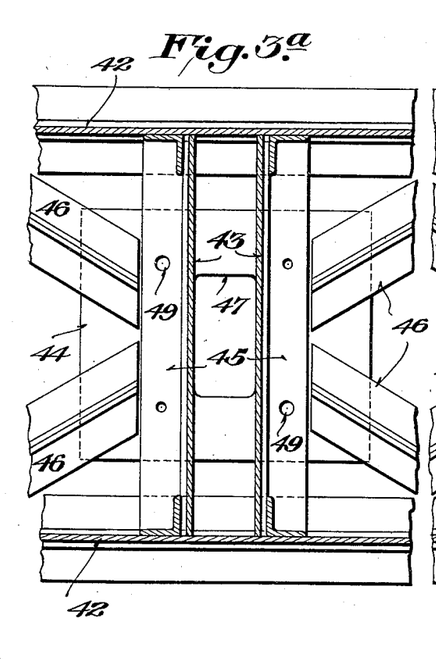

Referring now particularly to Figs. 3 and 3ª of the drawings, wherein is illustrated the central portion of a turntable of the continuous girder type constructed in accordance with the present invention, 42, 42 designate the spaced parallel girders on which are mounted the cross ties and rails as shown in Fig. 1, while 43, 43 designate a pair of spaced cross girders connecting the girders 42, 42 intermediate the ends of the latter and designed for transmitting loads imposed upon the turntable to the center mounting therefor.

Figure 11:
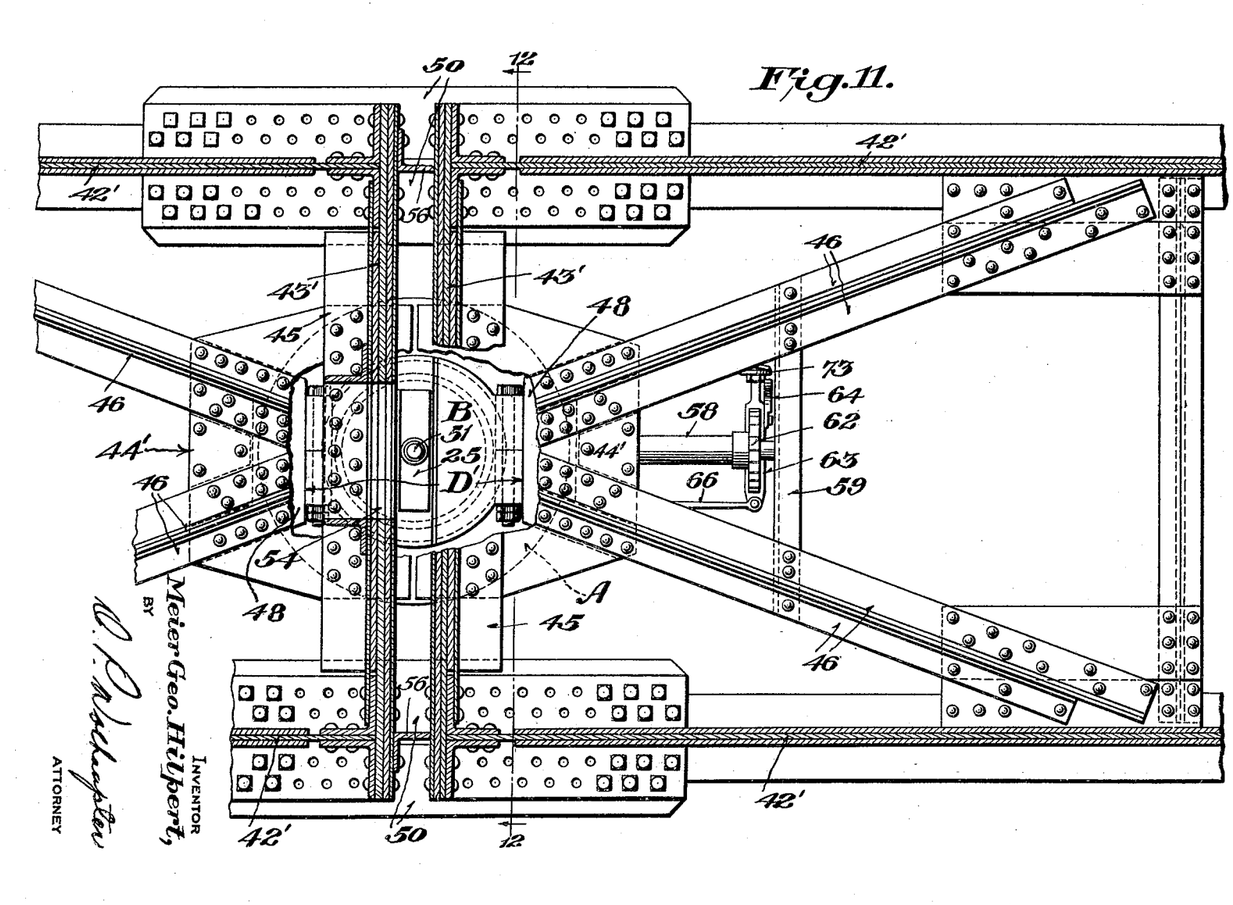
Figure 11 is a sectional plan view of the assembly shown in Fig. 10.

Beneath the cross girders 43, 43 is arranged a plate 44 which may be secured to the cross girders by means of angle pieces 45 and which preferably extends outwardly beyond said angle pieces to provide supports for the ends of the diagonal braces or thrust pieces 46. As shown in Fig. 11, these braces or thrust pieces are bolted or riveted at their outer ends to the girders 42, 42, and at their inner ends are bolted, riveted or otherwise secured rigidly to the plate 44. An opening 47 is formed centrally through said plate to snugly receive the lug or boss 25 of the cap B thereby to resist transverse displacement of the table, while upon the under face of said plate is secured a pair of opposed thrust abutments 48, 48 having transverse thrust faces adapted to fit and bear against the side faces of the thrust ring D whereby longitudinal forces imposed on the turntable are transmitted through the thrust ring D direct to the base A.

The turntable is adapted to be lowered to permit the abutments 48, 48 to engage with the thrust faces of the thrust ring D and elevated to disengage the same from the thrust ring; and to facilitate such engagement and disengagement and to assure a tight fit between the abutments 48, 48 and the ring D, the upper face portions D' of the thrust ring D are preferably tapered slightly upward and inward and the inner faces of the abutments 48, 48 are correspondingly flared downward and outward.

The plate 44 is adapted to rest upon the upper convex surface of the cap B and thus, while longitudinal forces imposed on the turntable will be transmitted to the base through the abutments 48, 48 and the ring D, vertical loads will be transmitted to the base through the cap B and wear disks C.

Openings 49 are formed through the angle pieces 45 and the plate 44 to enable connection of oil caps or lubricant supply pipes with the ducts 29 and to accommodate bolts or studs which may be employed for connecting the turntable with the cap B in instances where it is desired that said cap and the thrust ring shall be elevated with the turntable.

Figure 4:
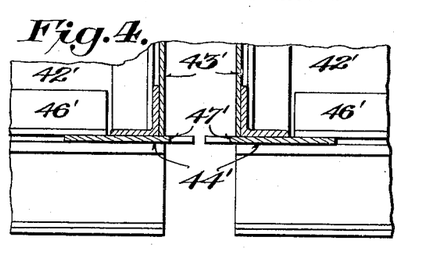
Figure 4 is a view similar to Fig. 3 showing an embodiment of the present cross girder construction for incorporation in a turntable of the articulated type to accommodate the present center mounting.
Figure 4A:
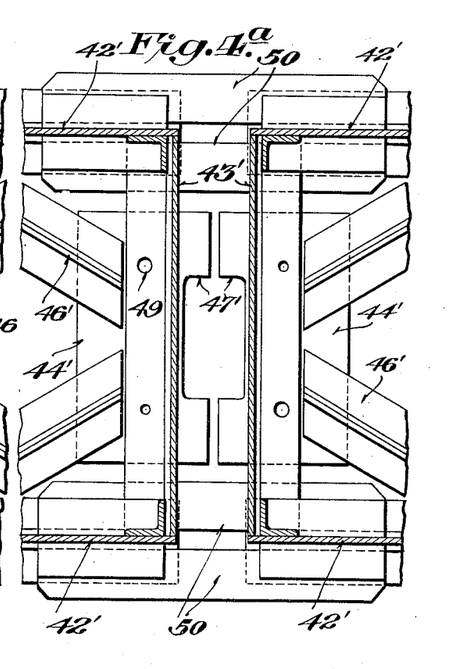

Referring now to Figs. 4, 4ª, 10, 11 and 12 of the drawings, it will be observed that the turntable illustrated in said figures is of the articulated girder type, the girders 42', 42' being parted intermediately and connected together by flexing plates 50. In order that the two spans of a turntable of this type may be constructed, shipped and erected separately, the cross girders 43' are built each with its related span and hence, the plate 44' is formed in two sections which are assembled, respectively, with their related spans, notches 47' being formed in said plates for registration with one another when the spans are connected by the flexing plates 50 to provide an opening snugly to receive the lug or boss 25 of the cap B. With this type of construction, the abutments 48, 48 are secured each to a plate 44' in the same way as for the continuous span.

The table construction and center mounting as described may be used irrespective of whether an internal combustion engine or engines or an electric motor or motors mounted on the table is or are employed for rotating the table, and irrespective of the manner in which current may be conducted to the electric motor or motors in the event this type of power is employed. However, it is desirable for various reasons, when an electric motor or motors is or are employed as the motive power for the turntable, to extend the power cables through the center mounting.

Figure 10:
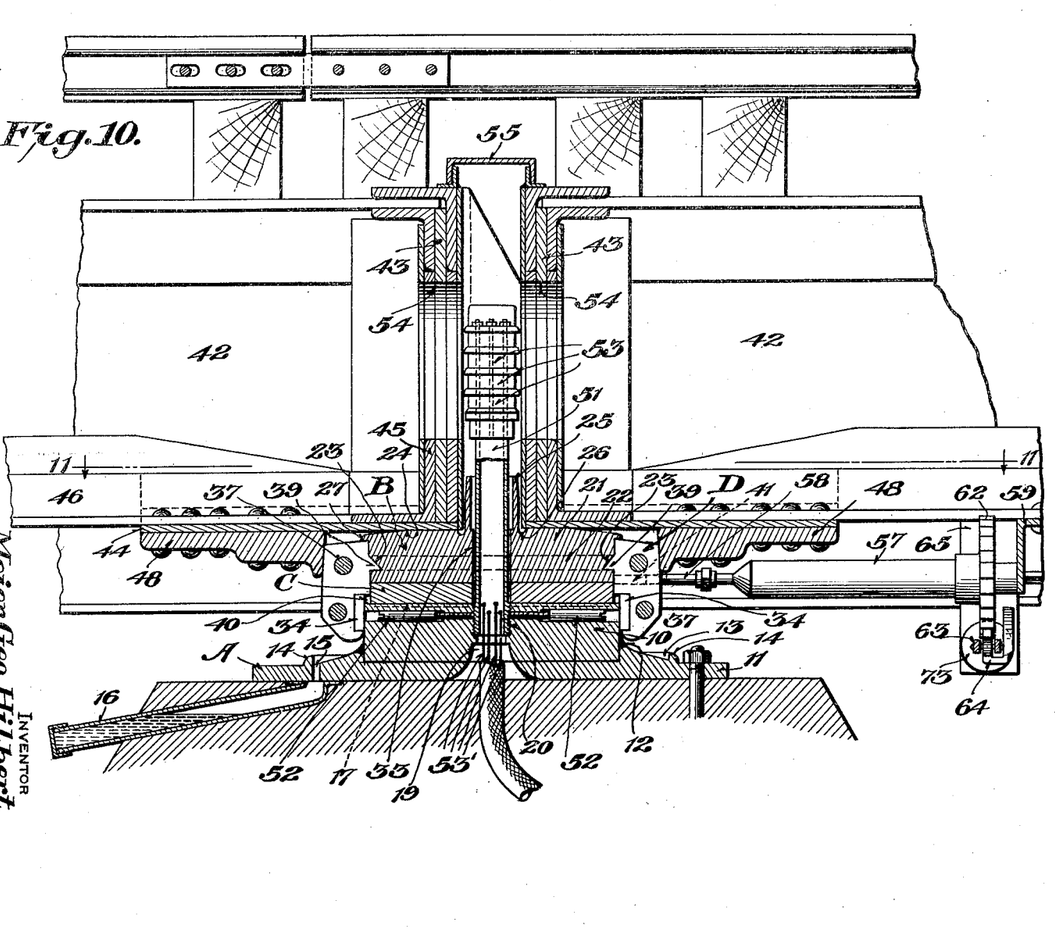
Figure 10 is a longitudinal sectional view illustrating the assembly of a turntable with the present center mounting.
Figure 12:
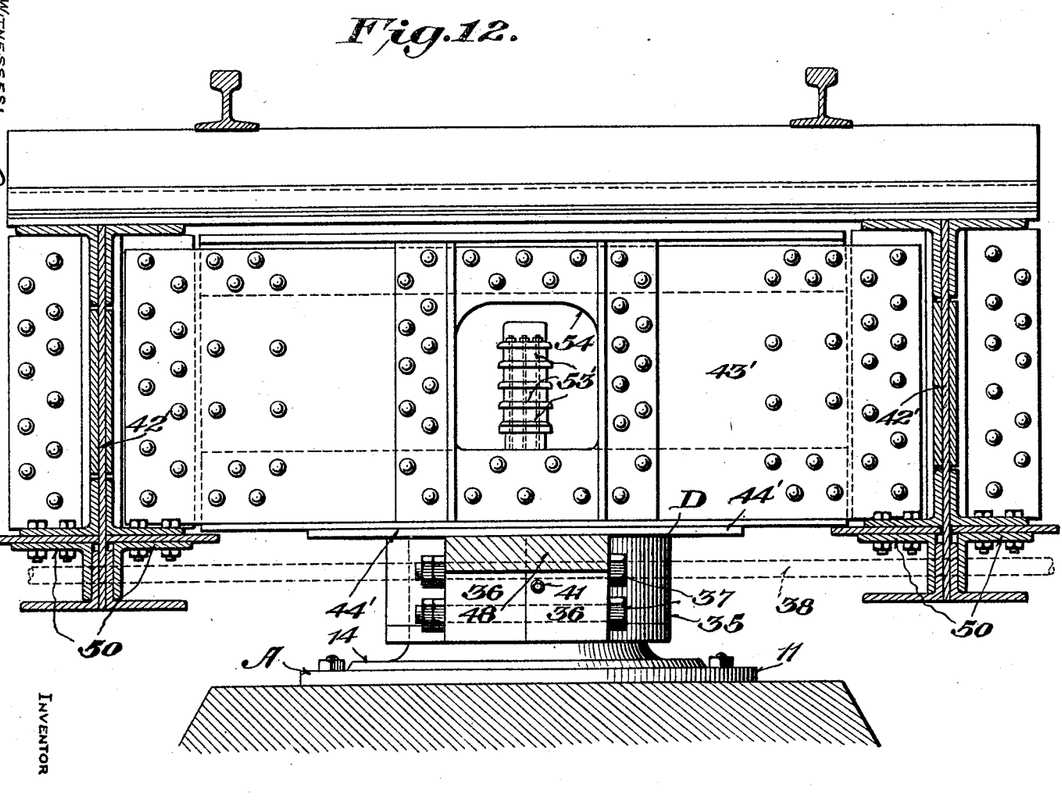
Figure 12 is a transverse sectional view of the assembly shown in Fig. 10.

The present center mounting is particularly adapted to have the power cables extended therethrough, and to this end a relatively heavy pipe or tube 51 may be threaded and secured, by set screws 52 or in other suitable manner, within the central opening 19—20 of the base, said pipe or tube being of a length to extend upwardly through the central opening in the wear disk and through the central opening in the cap B to a suitable point above the latter. On the upper end portion of this pipe or tube, between the cross girders of the turntable structure, are mounted suitable distributing rings with which the cables, designated as 53, are adapted for connection, and which are adapted to be engaged by suitably mounted brushes electrically connected with the motor or motors (not shown). As shown in Figs. 10, 11 and 12, the cross girders of the turntable structure may have openings 54 formed centrally therethrough for the accommodation of the brushes and the conductors leading from the brushes to the motors.

Figure 13:
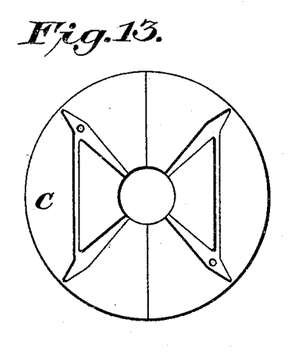
Figure 13 is a plan view of a two part or divided friction reducing member or wear disk used in the instances where the power cables are led through a fixed conduit in the middle of the center mounting.
Figure 14:
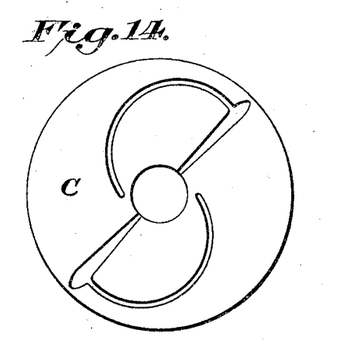
Figure 14 is a plan view of the base element used in connection with a divided wear disk.
Figures 15, 17:
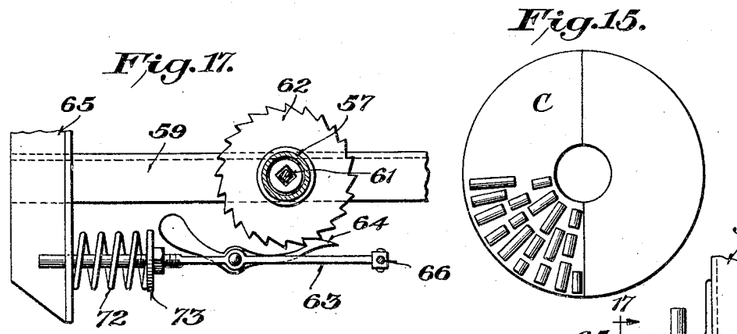
Figure 15 is a plan view of a so-called frictional or roller carrying disk which may be used in the center mounting in place of a friction reducing member or wear disk as shown in Figure 13.
Figure 17 is a side elevation of a part of the mechanism shown in Fig. 16.

When a pipe or tube 51 is employed it may be desirable to form the wear disk C in two sections as illustrated in Figs. 13 and 15 of the drawings, and in this event each section may be provided with individual lubricant distributing grooves arranged as shown in Fig. 13 for example, or, regardless of whether the disk is formed of one piece or of two sections, same may carry radial anti-friction rollers as shown in Fig. 15 for example, for cooperation with the adjacent faces of the base A and the cap B. In the event of a solid friction reducing disk being formed in two sections, lubricant distributing grooves in the cap and base may be formed as illustrated for example in Figure 14 of the drawings.

It is apparent, of course, that the present arrangement permits assembly of the pipe or tube 51 with the base, and assembly of the distributing rings 53 with said pipe or tube, prior to assembly of the turntable structure with the center mounting. In this connection it will be noted that a cover member 55 is provided to extend across the tops of the cross girders of the turntable structure to close the space between said cross girders and thus prevent entrance of rain, snow or the like into said space, but that by removing said cover the distributing rings 53 are rendered readily accessible for any purpose desired.

Preferably, the respective spans of the turntable structure are provided at their adjacent ends with vertically disposed guides 56 in the form of angle plates or of other suitable design for cooperation with one another to facilitate alinement and spacing of the spans during erection of the turntable, and to close the ends of the space between the cross girders.

Figure 16:
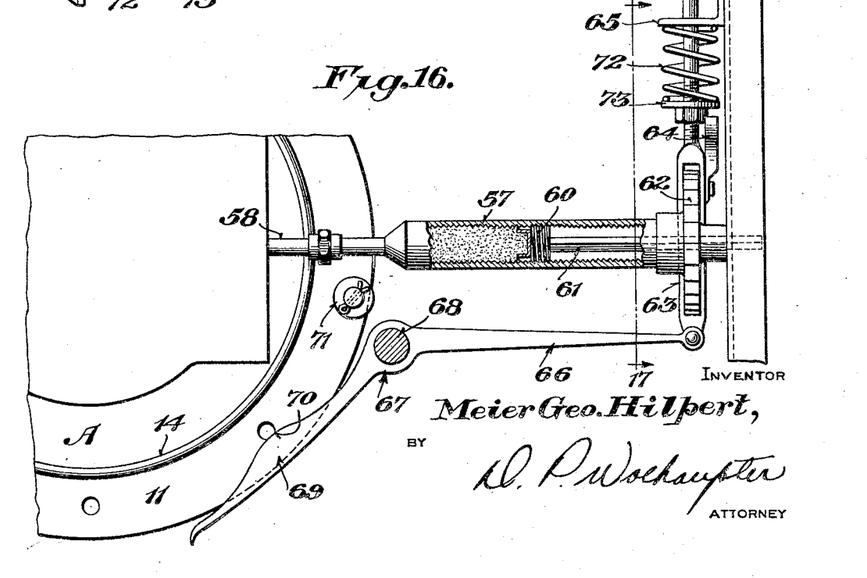
Figure 16 is a plan view, partly in section, of an automatic lubricant injecting mechanism for use with the present center mounting.

In Figs. 16 and 17 of the drawings is illustrated an automatic lubricant feed mechanism which may be employed in connection with the present center mounting. This mechanism comprises an internally threaded lubricant containing cylinder 57 adapted for connection at its inner end by a pipe 58 with one of the openings 41 in the thrust ring D and adapted to be supported at its outer end in any suitable manner, upon a cross member 59 for example, extending between a pair of the braces 46. Within said cylinder is threaded a piston or plunger 60 inclusive of a rod 61 which extends through a ratchet wheel 62 which may be rotatably mounted on the outer end portion of said cylinder, and said rod may be of polygonal cross section or otherwise splined to said ratchet wheel so as to be non-rotatable with respect thereto but slidable therethrough. Thus, by rotation of said ratchet wheel the piston or plunger may be fed towards the inner end of the cylinder to force lubricant therefrom through the pipe 58 into the center mounting.

Disposed either below or above the ratchet wheel 62 is a reciprocal member 63 which carries a pawl 64 for cooperation with the teeth of said wheel, said member being guided at one end in a bracket 65 carried by the cross member 59 and being supported at its other end by one arm 66 of a lever 67 which is intermediately pivoted, as at 68, to a suitable part of the turntable. The other arm 69 of said lever is provided with a cam formation 70 for engagement with an abutment 71 which may be in the form of a roller mounted on the base A, whereby the lever is rocked on its pivot when the turntable is rotated. That is to say, as the turntable is rotated and the cam formation on the arm 69 engages the abutment 71, the lever 67 is rocked on its pivot in a direction to cause the pawl 64 to effect rotation of the ratchet wheel 62 in a direction to effect a feeding movement of the piston 60 to inject lubricant into the center mounting, and after such operation the lever 67 is adapted to be returned to a normal position in readiness to repeat the operation, by a spring 72 which may be interposed between the bracket 65 and an abutment 73 on the member 63. Obviously, as many abutments 71 as desired may be provided so that lubricant will be injected at desired times into the center mounting.

From the foregoing description considered in connection with the accompanying drawings, it is believed to be manifest that the present construction affords, or is capable of affording, a very low center mounting; that the parts of the mounting are capable of being cheaply and easily produced; that the design allows of readily varying the lubricant according to the conditions of use of the turntable, i. e., using light lubricant in cold climates or weather and heavy lubricant in warm climates or weather; that the design permits quick and easy assembly and disassembly of the structure, and that there are various other advantages inherent to the structure which will be apparent to those skilled in the art to which the invention appertains.

Furthermore it will be apparent that the manner of arranging for the separation or parting of the sections 35 of the thrust ring D is of special importance since, in the arrangement shown, these members are adapted to take the maximum longitudinal thrust without danger of injury to the means for holding the sections together. That is to say, the sections 35, 35 meet on the longitudinal center of the turn table while the bolts 37 which hold them together are located directly at right angles to the line of separation or parting, thereby serving merely as means for holding the sections together, and not being subjected to longitudinal thrusts imposed on the center by the turntable span. The abutments 48, 48 have a square shoulder portion abutting with the transversely disposed ends of the sections 35, 35 and, therefore, all longitudinal thrusts imposed on the center by the span are transmitted directly by the abutments 48, 48 to the straight side faces or ends of the sections 35, 35. The bolts 37 therefore take no thrust stress.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A turntable center mounting comprising a base and a cap and an alining ring surrounding the joint between the cap and the base.

2. A turntable center mounting comprising a two part base, a cap mounted on the base and an alining ring embracing the cap and base.

3. A turntable center mounting comprising a base including a load distributing portion and a cylindrical portion, a cap, and an alining ring embracing the cap and base.

4. A turntable center mounting comprising a base, a cap, and an alining ring supported on and revolving with the cap and embracing the cap and base.

5. A turntable center mounting comprising a base, a cap, an alining ring carried by the cap and embracing the cap and base and having opposing thrust faces, a superposed span, and abutments carried by the span for engaging said thrust faces.

6. A turntable center mounting comprising a base, a cap, a friction reducing disk between the base and the cap, and an alining ring carried by the cap and embracing the cap and base.

7. A turntable center mounting comprising a base, a cap having an upstanding portion, a turntable span having an opening for receiving the upstanding portion on the cap to prevent transverse movement of the span on the cap.

8. A turntable center mounting comprising a base, a cap, said cap and base having a central cable passage opening, a combined alining and thrust transmitting ring on the cap and having opposing thrust faces, a span, and spaced abutments on the span for engaging said thrust faces.

9. A turntable center mounting comprising a base, a cap, a span mounted on the cap, a thrust transmitting ring divided on the longitudinal axis of the span and having thrust faces disposed at right angles to the line of division in the ring, and abutments carried by the span for engaging said thrust faces.

10. A turntable center mounting comprising a base, a cap, a bisected thrust ring embracing the cap and base, and means for holding the sections of the bisected ring together.

11. A turntable center mounting comprising a base, a cap, a bisected thrust ring embracing the cap and base, and means for holding the sections of the bisected ring together, thrust faces formed on the ring transversely of the line of division therein, a span mounted on the cap, and abutments carried by the span and engaging the thrust faces on the ring across the line of division between the sections thereof.

12. A turntable center mounting comprising a base, a cap, said base and cap having a central cable opening, a span mounted on the cap, a thrust ring divided on the longitudinal axis of the span, said span including a two part transverse span girder and maintenance openings in the webs of said transverse girders.

13. A turntable center mounting comprising a base, a cap having a convex span seat, an alining ring carried by the cap and embracing the cap and base, a span resting on said convex span seat, and abutments carried by the bottom of the span and cooperating with said alining ring to transmit longitudinal thrusts therethrough to the cap and base.

14. A turntable center construction including a base, a cap having span guides, a divided alining ring embracing the cap and base, a power collector ring, a two part transverse girder surmounting the cap and having abutment means for engaging the alining ring.

15. A turntable center mounting comprising a base, a cap on which the middle portion of the turntable is adapted to rest, a wear disk interposed between said cap and said base, and a ring embracing the cap, disk and base for holding said parts alined in superimposed relation.

16. A turntable center mounting comprising a base, and a cap rotatably mounted upon said base, the turntable being adapted to rest at its center upon said cap, and the upper face of the cap being convexly curved to direct the forces imposed thereon by the turntable towards the center of the mounting.

17. A turntable center mounting comprising a base, a cap rotatably mounted upon said base, a thrust ring surrounding portions of said cap and said base, the turntable being adapted to rest at its center upon said cap, and abutments carried by the turntable to fit over said thrust ring.

18. A turntable center mounting comprising a base, a cap rotatably mounted thereon, a ring embracing cylindrical portions of the cap and the base, and interfitting formations on the cap and said ring whereby the latter is supported by the cap.

19. A turntable center mounting comprising a base, a cap rotatably mounted thereon, a thrust ring embracing cylindrical portions of said base and said cap, and a wear ring carried by the turntable to fit in said thrust ring.

20. A turntable center mounting comprising a base, a cap rotatably mounted thereon, a boss projecting upwardly from the cap, and a plate carried by the turntable to rest upon the top of said cap, said plate having an opening to receive said boss.

21. A turntable center mounting comprising a base, a cap rotatably mounted on said base, and a thrust ring embracing said cap and said base, said thrust ring being formed of laterally separable sections.

22. A turntable center mounting comprising a base, a cap, an interposed wear disk, said base having a central opening, and a tube secured in said opening and extending upwardly through said wear disk and said cap to support electrical distributing rings and to house cables leading to said rings.

23. In a turntable center, a base including a central recessed portion and an upwardly directed cylindrical portion fitting in said recessed portion of the base, means for rotatably mounting the turntable upon said cylindrical portion, and means for rigidly connecting the cylindrical portion to the base.

24. A turntable center mounting comprising a base, a turntable supporting structure rotatably mounted on said base, means for the supply of lubricant between said supporting structure and said base, and means forming a trough around the base for the collection of any lubricant which may escape from between said supporting structure and said base.

25. A turntable center mounting comprising a base, a turntable supporting structure rotatably mounted on said base, means for the supply of lubricant between said supporting structure and said base, means forming a trough around the base for the collection of any lubricant which may escape from between said supporting structure and said base, and a lubricant collection receptable below said trough in communication with the latter.

26. A turntable center mounting comprising a base having an upwardly directed cylindrical portion, a cap having a downwardly directed cylindrical portion of less diameter than said base cylindrical portion, a wear disk of less diameter than the base cylindrical portion interposed between said cylindrical portions, and a thrust ring having portions of different diameter respectively embracing said cylindrical portions, the portion of said ring of greatest diameter cooperating with said wear disk to provide an annular lubricant containing space around the wear disk.

27. A turntable center mounting comprising a base, a cap rotatably mounted on said base, said cap having an annular channel, a thrust ring embracing said base and said cap, and a rib on said ring fitting into the channel in said cap.

28. A turntable center mounting comprising a base, a cap rotatably mounted on said base, said cap having an annular channel, a thrust ring embracing said base and said cap, and a rib on said ring fitting into the channel in said cap, said channel and said rib being of substantially V-shaped cross section with their lower faces disposed substantially horizontally.

29. A turntable center mounting comprising a base, a cap rotatably mounted thereon, a boss projecting upwardly from the cap, and a plate carried by the turntable to rest upon the top of said cap, said plate having an opening to receive said boss, and the top of the cap having channels formed therein adjacent to the sides of said boss and extending to the edge of the cap.

In testimony whereof I hereunto affix my signature.

MEIER GEORGE HILPERT.